(12) United States Patent
Ogawa et al.

(10) Patent No.: US 10,863,409 B2
(45) Date of Patent: Dec. 8, 2020

(54) MOBILE COMMUNICATION DEVICE AND COMMUNICATION MEDIUM INFORMATION GENERATING DEVICE

(71) Applicant: MITSUBISHI ELECTRIC CORPORATION, Tokyo (JP)

(72) Inventors: Yuji Ogawa, Tokyo (JP); Yuji Goto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 110 days.

(21) Appl. No.: 16/092,345

(22) PCT Filed: Apr. 22, 2016

(86) PCT No.: PCT/JP2016/062846
§ 371 (c)(1),
(2) Date: Oct. 9, 2018

(87) PCT Pub. No.: WO2017/183205
PCT Pub. Date: Oct. 26, 2017

(65) Prior Publication Data
US 2019/0150054 A1    May 16, 2019

(51) Int. Cl.
*H04W 36/32* (2009.01)
*H04W 36/14* (2009.01)
(Continued)

(52) U.S. Cl.
CPC ........... *H04W 36/32* (2013.01); *H04W 24/08* (2013.01); *H04W 36/0022* (2013.01);
(Continued)

(58) Field of Classification Search
CPC . H04W 36/32; H04W 24/08; H04W 36/0022; H04W 36/14; H04W 36/30;
(Continued)

(56) References Cited

U.S. PATENT DOCUMENTS

2008/0242305 A1* 10/2008 Kahlert ................ H04W 36/32
455/440
2013/0059585 A1* 3/2013 Giloh ..................... H04L 45/54
455/436

FOREIGN PATENT DOCUMENTS

JP   2005159873 A   6/2005
JP   2012005036 A   1/2012

OTHER PUBLICATIONS

International Search Report (PCT/ISA/210) dated May 31, 2016, by the Japan Patent Office as the International Searching Authority for International Application No. PCT/JP2016/062846.
(Continued)

*Primary Examiner* — Obaidul Huq
(74) *Attorney, Agent, or Firm* — Buchanan Ingersoll & Rooney PC

(57) ABSTRACT

A mobile communication device includes: a monitoring unit that monitors conditions of communication media; a control unit that controls switching communication media based on information indicating a communication medium having a good condition in each of a plurality of travel sections; and a switching unit that switches the communication medium to be used, wherein when a mobile object moves from a first section to a second section, the control unit causes the monitoring unit to monitor, in an area including a boundary between the first and second sections, radio wave conditions of a first communication medium having a good radio wave condition in the first section and a second communication medium having a good radio wave condition in the second section, and instructs the switching unit to perform switchover from the first communication medium to the second communication medium, based on results from the monitoring unit.

8 Claims, 6 Drawing Sheets

(51) Int. Cl.
  *H04W 36/30* (2009.01)
  *H04W 88/06* (2009.01)
  *H04W 24/08* (2009.01)
  *H04W 36/00* (2009.01)
(52) U.S. Cl.
  CPC .......... *H04W 36/14* (2013.01); *H04W 36/30* (2013.01); *H04W 88/06* (2013.01); *Y02D 30/70* (2020.08)
(58) Field of Classification Search
  CPC ....... H04W 88/06; Y02D 70/00; Y02D 70/12; Y02D 70/126; Y02D 70/10
  USPC ................................ 370/310, 328, 329, 331
  See application file for complete search history.

(56) References Cited

OTHER PUBLICATIONS

Written Opinion (PCT/ISA/237) dated May 31, 2016, by the Japan Patent Office as the International Searching Authority for International Application No. PCT/JP2016/062846.

* cited by examiner

MOBILE COMMUNICATION DEVICE AND COMMUNICATION MEDIUM INFORMATION GENERATING DEVICE

FIELD

The present invention relates to a mobile communication device that is mounted on a mobile object and performs radio communication with a ground base station, to a communication medium information generating device, and to a communication medium switching method.

BACKGROUND

In related art, for data communication between a ground base station and a train, a mobile communication device mounted on the train includes a plurality of communication media using different communication schemes, and monitors radio wave conditions of the respective communication media and selects a communication medium having a good radio wave condition for the data communication (Patent Literature 1). This enables the mobile communication device to establish good data communication with the ground base station in all of travel sections through which the train travels.

CITATION LIST

Patent Literature

Patent Literature 1: Japanese Patent Application Laid-open No. 2005-159873

SUMMARY

Technical Problem

For the technique of the related art, unfortunately, the mobile communication device needs to always monitor the radio wave conditions of the communication media in order to select a communication medium having a good radio wave condition. This is disadvantageous in that processing load on the mobile communication device increases due to the monitoring of the radio wave conditions of the respective communication media.

The present invention has been made in view of the above, and an object thereof is to provide a mobile communication device capable of performing good radio communication with a ground base station while reducing the processing load.

Solution to Problem

To solve the aforementioned problems and achieve the object, the present invention provides a mobile communication device to be mounted on a mobile object and perform radio communication with a ground base station, the mobile communication device comprising: a radio wave condition monitoring unit capable of monitoring radio wave conditions of a plurality of communication media to be used for communication with the ground base station; a storage unit to store communication medium information, the communication medium information indicating a communication medium having a good radio wave condition in each of a plurality of travel sections into which a route is divided, the mobile object traveling on the route; a switching control unit to perform control for switching a communication medium to be used, on the basis of the communication medium information when the travel section in which the mobile object is traveling is changed; and a radio communication switching unit to switch the communication medium to be used, under control of the switching control unit. When the mobile object moves from a first travel section to a second travel section, the switching control unit causes the radio wave condition monitoring unit to monitor, in a monitoring area, a radio wave condition of a first communication medium and a radio wave condition of a second communication medium, the first communication medium having a good radio wave condition in the first travel section, the second communication medium having a good radio wave condition in the second travel section, the monitoring area being a preset area including a boundary between the first travel section and the second travel section, the switching control unit instructing the radio communication switching unit to perform switchover from the first communication medium to the second communication medium, on the basis of monitoring results provided by the radio wave condition monitoring unit.

Advantageous Effects of Invention

The present invention produces an advantageous effect of performing the good radio communication with the ground base station while reducing the processing load.

DESCRIPTION OF EMBODIMENTS

A mobile communication device, a communication medium information generating device, and a communication medium switching method according to an embodiment of the present invention will be described in detail below with reference to the drawings. Note that the present invention is not limited to the embodiment.

Embodiment

Figure 1:
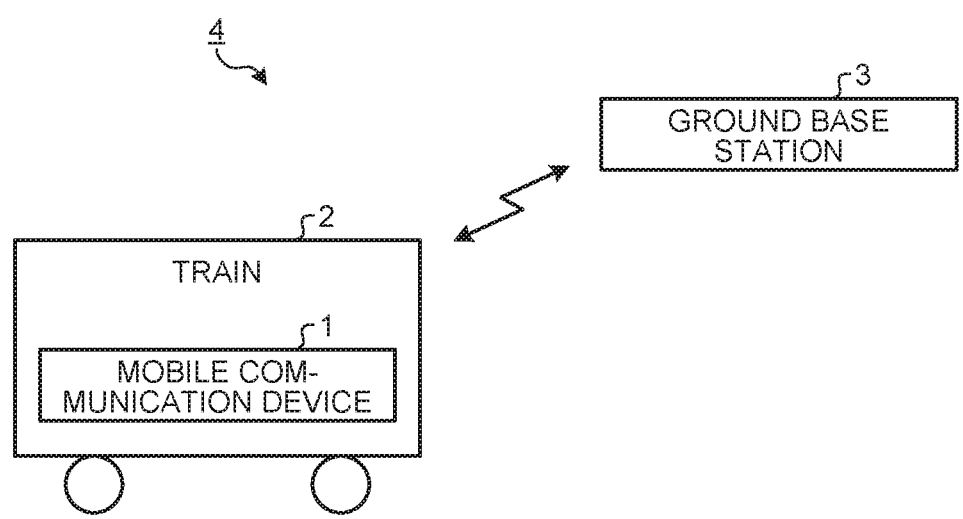
FIG. 1 is a diagram illustrating an example configuration of a train radio communication system including a train on which a mobile communication device is mounted and a ground base station.

FIG. 1 is a diagram illustrating an example configuration of a train radio communication system 4 including a train 2 on which a mobile communication device 1 according to the embodiment of the present invention is mounted and a ground base station 3. Although the mobile communication device 1 will be described below on the assumption that the mobile communication device 1 is mounted on the train 2, which is a moving object, the moving object on which the mobile communication device 1 is mounted is not limited to the train 2. The mobile communication device 1 performs data communication through radio communication with the ground base station 3 in a ground system that controls, for example, service of the train 2.

Figure 2:
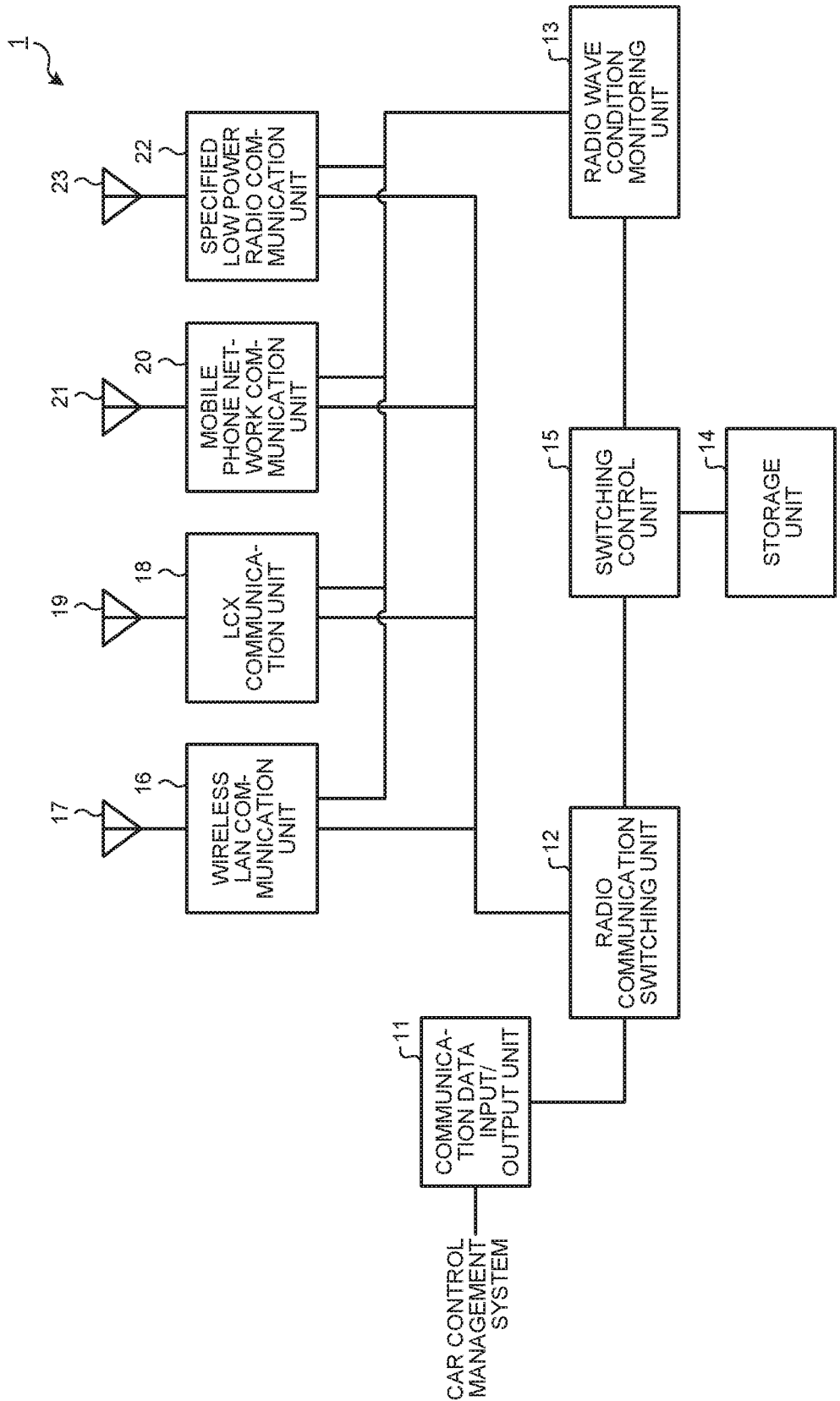
FIG. 2 is a block diagram illustrating an example configuration of the mobile communication device.

FIG. 2 is a block diagram illustrating an example configuration of the mobile communication device 1 according to the present embodiment. The mobile communication device 1 includes a communication data input/output unit 11, a radio communication switching unit 12, and a radio wave condition monitoring unit 13. T communication data input/output unit 11 receives and transmits communication data from and to a vehicle control management system that processes control information from the ground system acquired through radio communication with the ground base station 3. The radio communication switching unit 12 is controlled by a switching control unit 15 such that the radio communication switching unit 12 switches a communication medium to be used in radio communication with the ground base station 3, as will be described later. The radio wave condition monitoring unit 13 is capable of monitoring radio wave conditions of a plurality of communication media to be used for communication with the ground base station 3. Although not illustrated in FIG. 1, the car control management system is installed in the train 2.

The mobile communication device 1 also includes a storage unit 14 and the switching control unit 15. The storage unit 14 stores communication medium information, which is information indicating a communication medium having a good radio wave condition in each of a plurality of travel sections into which a route of the train 2 between a start point and an end point is divided. On the basis of the communication medium information stored in the storage unit 14, the switching control unit 15 controls the radio communication switching unit 12 to switch the communication medium to be used for radio communication with the ground base station 3 when the travel section in which the train 2 travels is changed as the train 2 moves. The switching control unit 15 acquires information on the position of the train 2 through a position information acquiring unit, which is not illustrated in FIGS. 1 and 2. The position information acquiring unit may obtain a distance traveled from speed information on the train 2 provided by a tachometer to acquire information on the current position of the train 2, or may use a global positioning system (GPS) satellite to acquire information on the current position of the train 2.

The mobile communication device 1 also includes a wireless LAN communication unit 16 and an antenna 17 used by the wireless LAN communication unit 16. The wireless LAN communication unit 16 is a communication medium for performing data communication with the ground base station 3 through radio communication over a wireless local area network (LAN). The mobile communication device 1 also includes an LCX communication unit 18 and an antenna 19 used by the LCX communication unit 18. The LCX communication unit 18 is a communication medium for performing data communication with the ground base station 3 through radio communication via a leaky coaxial cable (LCX). The mobile communication device 1 also includes a mobile phone network communication unit 20 and an antenna 21 used by the mobile phone network communication unit 20. The mobile phone network communication unit 20 is a communication medium for performing data communication with the ground base station 3 through radio communication via a mobile phone network. The mobile communication device 1 also includes a specified low power radio communication unit 22 and an antenna 23 used by the specified low power radio communication unit 22. The specified low power radio communication unit 22 is a communication medium for performing data communication with the ground base station 3 through radio communication using specified low power radio.

The mobile communication device 1 includes, by way of example, four communication media, which are the wireless LAN communication unit 16, the LCX communication unit 18, the mobile phone network communication unit 20, and the specified low power radio communication unit 22. The mobile communication device 1 may include communication media other than these four communication media, or may include two or three of these four communication media.

Figure 3:
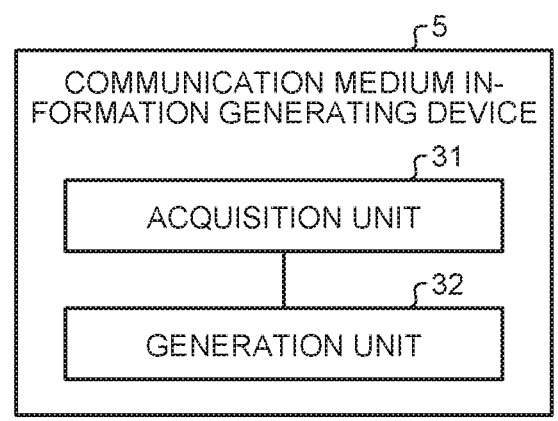
FIG. 3 is a block diagram illustrating an example configuration of a communication medium information generating device.

The communication medium information stored in the storage unit 14 of the mobile communication device 1 is generated in advance by the communication medium information generating device. FIG. 3 is a block diagram illustrating an example configuration of the communication medium information generating device 5 according to the present embodiment. The communication medium information generating device 5 includes an acquisition unit 31 and a generation unit 32. The acquisition unit 31 acquires information on radio wave conditions of a plurality of communication media, the information being collected by the mobile communication device 1. The generation unit 32 generates the communication medium information by using the information on the radio wave conditions of the communication media, the information on the radio wave conditions of the communication media being acquired by the acquisition unit 31. The communication medium information generating device 5 may be installed in the ground system or may be installed in the train 2.

For the mobile communication device 1, the radio wave condition monitoring unit 13 is controlled by the control of the switching control unit 15 to monitor the radio wave condition of each communication medium on the route of the train 2 to collect the information on the radio wave condition of each communication medium, as a precondition for controlling the radio communication switching unit 12 to switch the communication medium to be used for radio communication with the ground base station 3. The radio wave condition monitoring unit 13 collects the information on the radio wave condition of each communication medium at a preset interval on the route of the train 2 by using, for example, a probe packet technique enabling radio wave conditions to be identified from a loss rate of measurement packets. The radio wave condition monitoring unit 13 may collect the information on the radio wave condition of each communication medium under different conditions such as different time zones or different climates. To collect the information on the radio wave conditions of the communication media to be used for generation of the communication medium information, the switching control unit 15 controls the radio wave condition monitoring unit 13 to monitor the radio wave conditions of the communication media on the route, and stores the information on the radio wave conditions of the communication media collected by the radio wave condition monitoring unit 13 into the storage unit 14.

Through radio communication or via a storage medium, the acquisition unit 31 of the communication medium information generating device 5 acquires from the storage unit 14 of the mobile communication device 1 the information on the radio wave condition of each communication medium collected by the radio wave condition monitoring unit 13. The generation unit 32 generates the communication medium information by using the information on the radio wave condition of each communication medium collected by the radio wave condition monitoring unit 13. The generation unit 32 generates communication medium information by, for example, determining a range on the route as one travel section in which radio wave condition of one communication medium is good, and associating with the determined travel section the information on the communication medium having the good radio condition. The size of the range may differ depending on the travel section. The ranges of the respective travel sections may be determined in advance, and the generation unit 32 may select a communication medium having a good radio wave condition from among the determined ranges of the travel sections. The generation unit 32 may select, as the communication medium having a good radio wave condition, one communication medium having the best radio wave condition or may select a plurality of communication media having radio wave conditions equal to or better than a preset threshold. The mobile communication device 1 acquires, through radio communication or via a storage medium, the communication medium information generated by the communication medium information generating device 5, and stores the communication medium information into the storage unit 14. The term "radio communication" in the above phrase "through radio communication" mentioned means any of a wireless LAN, an LCX, a mobile phone network, and a specified low power radio, for example.

Figure 4:
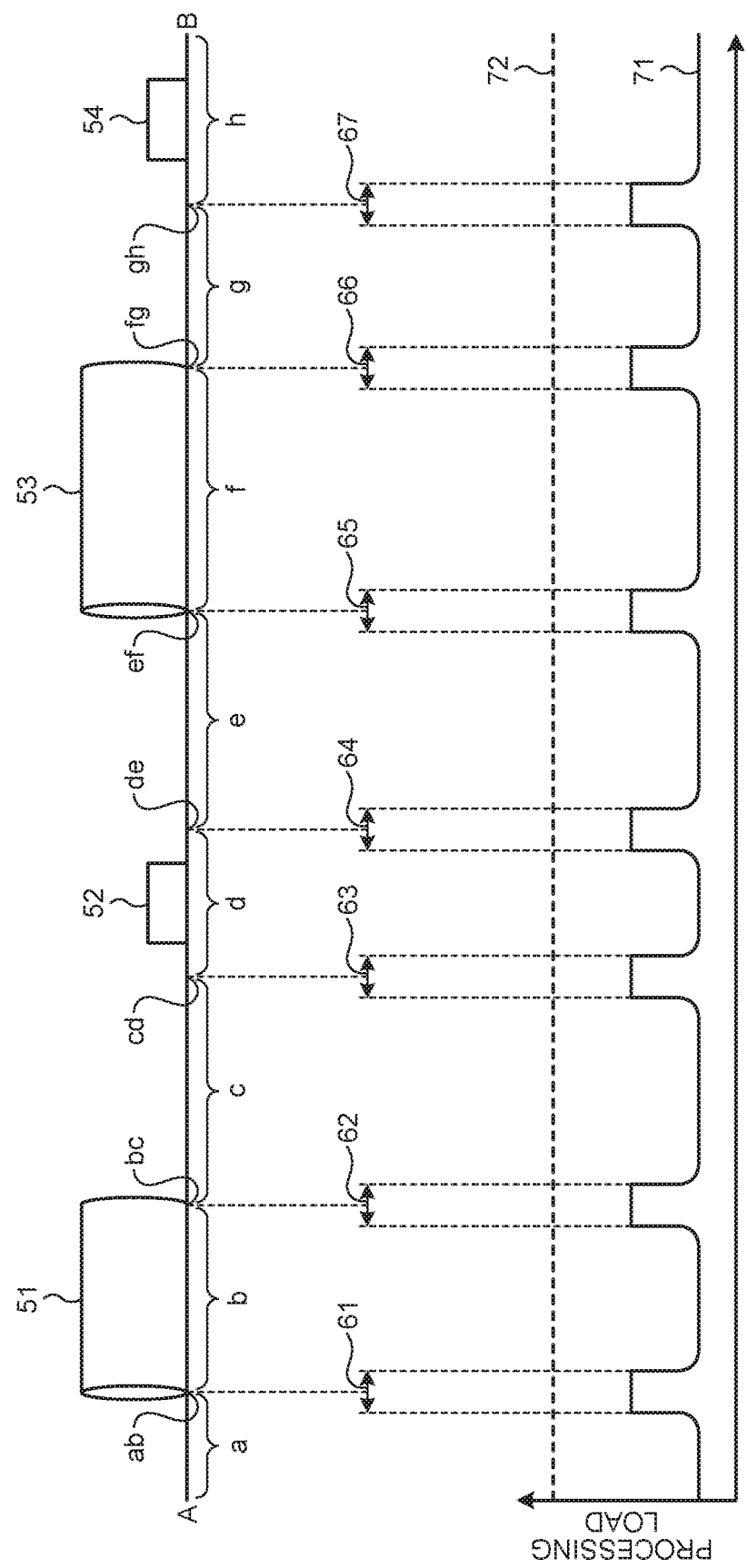
FIG. 4 is a diagram illustrating a route of the train on which the mobile communication device is mounted, and an image of processing load on the mobile communication device.

Next, the control for switching the communication medium to be used by the mobile communication device 1 for radio communication with the ground base station 3 will be described. FIG. 4 is a diagram illustrating the route of the train 2 on which the mobile communication device 1 according to the present embodiment is mounted, and an image of the processing load on the mobile communication device 1. In FIG. 4, the horizontal axis represents the position on the route from a start point A to an end point B, and the vertical axis of the diagram of the lower part of FIG. 4 represents the processing load on the mobile communication device 1. Herein, the route of the train 2 is illustrated, by way of example, as a section from the start point A to the end point B, and the route from the start point A to the end point B is divided into eight travel sections "a", "b", "c", "d", "e", "f", "g", and "h". In FIG. 4, a boundary "ab" represents the boundary between the travel section "a" and the travel section "b", a boundary "bc" represents the boundary between the travel section "b" and the travel section "c", a boundary "cd" represents the boundary between the travel section "c" and the travel section "d", a boundary "de" represents the boundary between the travel section "d" and the travel section "e", a boundary "ef" represents the boundary between the travel section "e" and the travel section "f", a boundary "fg" represents the boundary between the travel section "f" and the travel section "g", and a boundary "gh" represents the boundary between the travel section "g" and the travel section "h".

The storage unit 14 of the mobile communication device 1 stores the communication medium information indicating a communication medium having a good radio wave condition for each of the eight travel sections "a" to "h" into which the route from the start point A to the end point B on which the train 2 travels are divided. According to the communication medium information of the route illustrated in FIG. 4, the communication medium having a good radio wave condition in the travel section "a" providing good visibility is the mobile phone network communication unit 20, for example. In addition, the communication medium having a good radio wave condition in the travel section "b" in a tunnel 51 and the travel section "f" in a tunnel 53 is the LCX communication unit 18. In addition, the communication medium having a good radio wave condition in the travel section "c" between the tunnel 51 and a station 52, the travel section "e" between the station 52 and the tunnel 53, and the travel section "g" between the tunnel 53 and a station 54 is the specified low power radio communication unit 22. In addition, the communication media having good radio wave conditions in the travel section "d" including the station 52 and the travel section "h" including the station 54, are the wireless LAN communication unit 16 and the LCX communication unit 18.

In the mobile communication device 1, the switching control unit 15 controls the radio communication switching unit 12 to control switching of the communication medium to be used for communication with the ground base station 3 on the basis of the communication medium information stored in the storage unit 14 when the travel section in which the train 2 is traveling is changed as the train 2 moves. Note that, when the train travels, for example, from the travel section "a" to the travel section "b", the switching control unit 15 controls the radio wave condition monitoring unit 13 such that the radio wave condition monitoring unit 13 monitors the radio conditions of the communication media in a range of a monitoring area 61 that is a preset area including the boundary "ab", and controls the radio communication switching unit 12 such that the communication medium is switched on the basis of the monitoring results provided by the radio wave condition monitoring unit 13. Similarly, the switching control unit 15 causes the radio wave condition monitoring unit 13 to monitor the radio wave conditions of the communication media in the ranges of a monitoring area 62 that is a preset area including the boundary "bc", a monitoring area 63 that is a preset area including the boundary "cd", a monitoring area 64 that is a preset area including the boundary "de", a monitoring area 65 that is a preset area including the boundary "ef", a monitoring area 66 that is a preset area including the boundary "fg", and a monitoring area 67 that is a preset area including the boundary "gh".

Specifically, when the train 2 moves from the travel section "a" that is a first travel section to the travel section "b" that is a second travel section, the switching control unit 15 causes the radio wave condition monitoring unit 13 to monitor, in the monitoring area 61, the radio wave condition of the mobile phone network communication unit 20 and the radio wave condition of the LCX communication unit 18, the mobile phone network communication unit 20 being a first communication medium having a good radio wave condition in the travel section "a" that is the first travel section, the LCX communication unit 18 being a second communication medium having a good radio wave condition in the travel section "b" that is the second travel section. On the basis of the monitoring results provided by the radio wave condition monitoring unit 13, the switching control unit 15 instructs the radio communication switching unit 12 to perform switchover from the mobile phone network communication unit 20 to the LCX communication unit 18. The switching control unit 15 instructs the radio communication switching unit 12 to switch the communication medium to be used from the mobile phone network communication unit 20 to the LCX communication unit 18 at a timing when the radio wave condition of the LCX communication unit 18 becomes better than that of the mobile phone network communication unit 20, for example. The switching control unit 15 controls the radio wave condition monitoring unit 13 so that the radio wave condition monitoring unit 13 does not monitor the radio wave conditions of the communication media outside the monitoring areas.

In this manner, the mobile communication device 1 refers to the communication medium information, monitors, in the monitoring area including a boundary between the travel sections of the train, the radio wave conditions of the communication media used in the travel sections before and after the boundary, and does not monitor the radio wave conditions of the communication media outside the monitoring areas. This enables the mobile communication device 1 to reduce the processing load in communication with the ground base station 3, in contrast to a mobile communication device that always monitors the radio wave conditions of a plurality of communication media and, upon change in the communication medium having a good radio wave condition, switches the communication medium to be used.

The diagram of the lower part of FIG. 4 illustrates a dotted line 72 representing an image of the processing load on a mobile communication device that always monitors the radio wave conditions of a plurality of communication media, and a solid line 71 representing an image of the processing load on the mobile communication device 1 of the present embodiment. As illustrated, the processing load on the mobile communication device 1 outside the monitoring areas including boundaries between travel sections is small. In addition, the processing load on the mobile communication device 1 is large in the monitoring areas including the boundaries between travel sections, but is still smaller than the processing load on the mobile communication device that always monitors the radio wave conditions of a plurality of communication media, because the mobile communication device 1 monitors the limited number of communication media even under such a large processing load. While the horizontal axis in FIG. 4 indicates the position on the route from the start point A to the end point B, the horizontal axis may indicate an elapsed time, which is the traveling time of the train 2.

In the mobile communication device 1, when an instruction position that is a position on the route at which the switching control unit 15 has instructed the radio communication switching unit 12 to switch the communication medium is different from a boundary between travel sections, the switching control unit 15 may store into the storage unit 14 information on the difference between the instruction position on the route and the boundary. On the basis of the stored information on the difference, the switching control unit 15 can perform control for changing the size of a monitoring area. For example, the switching control unit 15 makes the size of the monitoring area larger than the current size of the monitoring area when the information on the difference is equal to or larger than a preset threshold, and makes the size of the monitoring area smaller than the current size of the monitoring area when the information on the difference is smaller than the preset threshold. Since the mobile communication device 1 can decrease the size of the monitoring when the difference is small, the mobile communication device 1 can reduces the processing load for monitoring the radio wave conditions of the communication media.

The information on the difference can also be used by the communication medium information generating device 5. In the communication medium information generating device 5, the acquisition unit 31 acquires the information on the difference from the mobile communication device 1 through radio communication or via a storage medium, and the generation unit 32 modifies the communication medium information, more specifically, modifies the position of the boundary between the travel sections by using the information on the difference. This enables the communication medium information to be updated with current radio wave conditions. Since the communication medium information is updated with the current radio wave conditions, the mobile communication device 1 is expected to reduce the difference between the instruction position and the boundary and thus reduce the size of the monitoring area, which further reduces the processing load for monitoring the radio wave conditions of the communication media.

Figure 5:
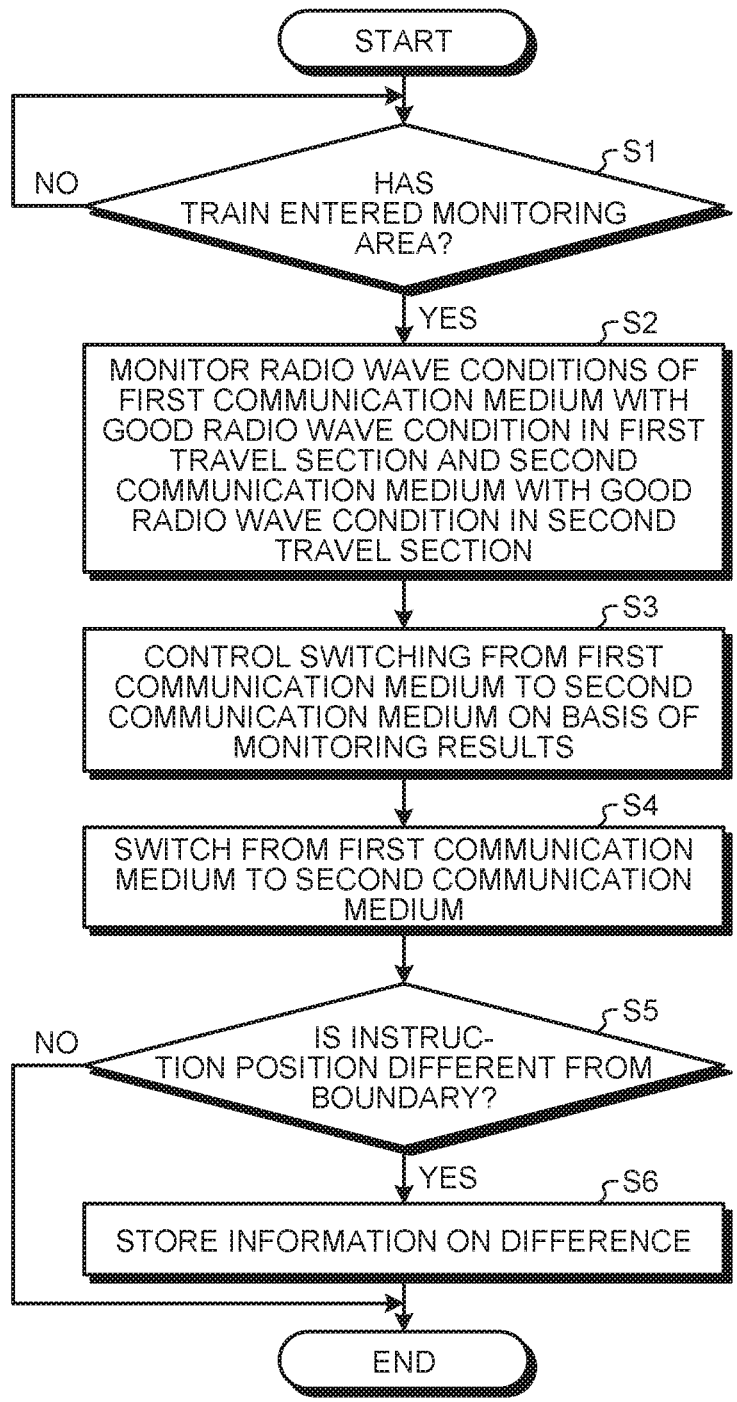
FIG. 5 is a flowchart illustrating a communication medium switching process of the mobile communication device.

A process according to a communication medium switching method of the mobile communication device 1 will be described with reference to a flowchart. FIG. 5 is a flowchart illustrating the communication medium switching process of the mobile communication device 1 according to the present embodiment. In the mobile communication device 1, first, the switching control unit 15 acquires information on a position of the train 2 from the position information acquiring unit, which is not illustrated, and checks whether or not the train 2 has entered a monitoring area including a boundary between travel sections (step S1). If the train 2 does not enter the monitoring area (step S1: No), the switching control unit 15 continues monitoring the position of the train 2.

If the train 2 has entered a monitoring area (step S1: Yes), the switching control unit 15 gives instruction to the radio wave condition monitoring unit 13 such that the radio wave condition monitoring unit 13 monitors: the radio wave condition of a first communication medium having a good radio wave condition in a first travel section in which the train 2 is currently traveling; and the radio wave condition of a second communication medium having a good radio wave condition in a second travel section in which the train 2 will travel after the first travel section (step S2).

On the basis of the monitoring results provided by the radio wave condition monitoring unit 13, the switching control unit 15 controls switchover from the first communication medium to the second communication medium, and gives instruction to the radio communication switching unit 12 at the timing of switchover from the first communication medium to the second communication medium (step S3). Under the control of the switching control unit 15, that is, upon receiving the instruction from the switching control unit 15, the radio communication switching unit 12 then switches the communication medium to be used for the radio communication with the ground base station 3 from the first communication medium to the second communication medium (step S4).

If the instruction position, which is the position on the route at which the switching control unit 15 has instructed the radio communication switching unit 12 to switch the communication medium, is different from the boundary between the first travel section and the second travel section (step S5: Yes), the switching control unit 15 stores information on the difference between the instruction position on the route and the boundary into the storage unit 14 (step S6). If the instruction position on the route at which the switching control unit 15 has instructed the radio communication switching unit 12 to switch the communication medium coincides with the boundary between the first travel section and the second travel section (step S5: No), the switching control unit 15 omits step S6 and terminates the process.

Next, a hardware configuration of the mobile communication device 1 will be described. In the mobile communication device 1, the communication data input/output unit 11 is implemented by an interface circuit capable of transmitting and receiving communication data. The wireless LAN communication unit 16 and the antenna 17 are implemented by a communication device capable of performing radio communication over a wireless LAN. The LCX communication unit 18 and the antenna 19 are implemented by a communication device capable of performing radio communication via an LCX. The mobile phone network communication unit 20 and the antenna 21 are implemented by a communication device capable of performing radio communication over a mobile phone network. The specified low power radio communication unit 22 and the antenna 23 are implemented by a communication device capable of performing radio communication using specified low power. The storage unit 14 is implemented by a memory. The radio communication switching unit 12, the radio wave condition monitoring unit 13, and the switching control unit 15 are implemented by a processing circuit. Specifically, the mobile communication device 1 includes a processing circuit for monitoring the radio wave conditions of a plurality of communication media in monitoring areas, controlling switchover to a communication medium on the basis of the monitoring results, and switching the communication medium. The processing circuit may be constituted by a memory and a central processing unit (CPU) that executes programs stored in the memory, or may be dedicated hardware.

Figure 6:
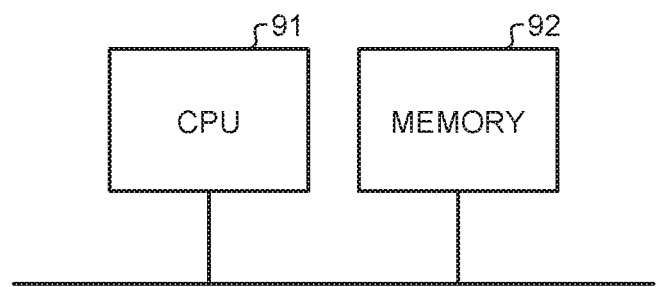
FIG. 6 is a diagram illustrating an example in which a processing circuit of the mobile communication device is constituted by a CPU and a memory.

FIG. 6 is a diagram illustrating an example in which the processing circuit of the mobile communication device 1 is implemented by a CPU and a memory. When the processing circuit is implemented by a CPU 91 and a memory 92, the functions of the radio communication switching unit 12, the radio wave condition monitoring unit 13, and the switching control unit 15 are implemented by software, firmware, or a combination of software and firmware. The software or firmware is described in the form of programs and stored in the memory 92. For the processing circuit, the functions are implemented by the CPU 91 reading and executing the programs stored in the memory 92. Thus, the mobile communication device 1 includes the memory 92 for storing programs, which, when the radio communication switching unit 12, the radio wave condition monitoring unit 13, and the switching control unit 15 are executed by the processing circuit, results in execution of a step of monitoring radio wave conditions of a plurality of communication media in monitoring areas, a step of controlling switching to a communication medium on the basis of the monitoring results, and a step of switching the communication medium. In other words, these programs cause a computer to execute the procedures and the methods of the mobile communication device 1. Note that the CPU 91 may be a processing device, a computing device, a microprocessor, a microcomputer, a processor, a digital signal processor (DSP), or the like. In addition, the memory 92 is a volatile or nonvolatile semiconductor memory such as a random access memory (RAM), a read only memory (ROM), a flash memory, an erasable programmable ROM (EPROM), or an electrically EPROM, a magnetic disk, a flexible disk, an optical disk, a compact disc, a mini disc, a digital versatile disc (DVD), or the like, for example. The memory 92 may be the memory implementing the storage unit 14.

Figure 7:
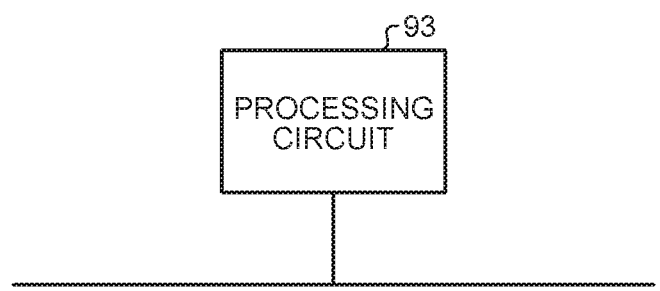
FIG. 7 is a diagram illustrating an example in which the processing circuit of the mobile communication device is constituted by dedicated hardware.

FIG. 7 is a diagram illustrating an example in which the processing circuit of the mobile communication device 1 according to the present embodiment is implemented by dedicated hardware. When the processing circuit unit is dedicated hardware, a processing circuit 93 illustrated in FIG. 7 is, for example, a single circuit, a composite circuit, a programmed processor, a parallel-programmed processor, an application specific integrated circuit (ASIC), a field programmable gate array (FPGA), or a combination thereof. The functions of the radio communication switching unit 12, the radio wave condition monitoring unit 13, and the switching control unit 15 may be implemented separately by the processing circuit 93 or may be implemented collectively by the processing circuit 93.

Alternatively, some of the functions of the radio communication switching unit 12, the radio wave condition monitoring unit 13, and the switching control unit 15 may be implemented by dedicated hardware, and others may be implemented by software or firmware. As described above, the processing circuit is capable of implementing the above-described functions by dedicated hardware, software, firmware, or combination thereof.

As described above, according to the present embodiment, in the mobile communication device 1, when the mobile object 2 moves from a first travel section to a second travel section, the switching control unit 15 controls the radio wave condition monitoring unit 13 such that the radio wave condition monitoring unit 13 monitors, in a monitoring area including the boundary between the first travel section and the second travel section, the radio wave condition of a first communication medium having a good radio wave condition in the first travel section and the radio wave condition of a second communication medium having a good radio wave condition in the second travel section, and the switching control unit 15 controls switchover from the first communication medium to the second communication medium on the basis of the monitoring results provided by the radio wave condition monitoring unit 13 and gives instruction to the radio communication switching unit 12. This enables the mobile communication device 1 to perform good communication with the ground base station 3 while reducing the processing load in contrast to the mobile communication device that always monitors the radio wave conditions of communication media.

The configurations presented in the embodiment above are examples of the present invention, and can be combined with other known technologies or can be partly omitted or modified without departing from the scope of the present invention.

REFERENCE SIGNS LIST 1 mobile communication device; 2 train; 3 ground base station; 4 train radio communication system; 5 communication medium information generating device; 11 communication data input/output unit; 12 radio communication switching unit; 13 radio wave condition monitoring unit; 14 storage unit; 15 switching control unit; 16 wireless LAN communication unit; 17, 19, 21, 23 antenna; 18 LCX communication unit; 20 mobile phone network communication unit; 22 specified low power radio communication unit; 31 acquisition unit; 32 generation unit.

The invention claimed is:

1. A mobile communication device to be mounted on a mobile object and perform radio communication with a ground base station, the mobile communication device comprising:
a radio wave condition monitor capable of monitoring radio wave conditions of a plurality of communication media that use different respective communication schemes for communication with the ground base station;
a storage to store communication medium information, the communication medium information indicating a communication medium having a good radio wave condition in each of a plurality of travel sections into which a route is divided, the mobile object traveling on the route;
a switching controller to perform control for switching a communication medium to be used, on the basis of the communication medium information and position of the mobile object when the travel section in which the mobile object is traveling is changed; and
a radio communication switch to switch the communication medium to be used, under control of the switching controller, wherein
when the mobile object moves from a first travel section to a second travel section, the switching controller causes the radio wave condition monitor to monitor, in a monitoring area, a radio wave condition of a first communication medium and a radio wave condition of a second communication medium, the first communication medium having a good radio wave condition in the first travel section, the second communication medium having a good radio wave condition in the second travel section, the monitoring area being a preset area including a boundary between the first travel section and the second travel section, the switching controller instructing the radio communication switch to perform switchover from the first communication medium to the second communication medium, on the basis of monitoring results provided by the radio wave condition monitor, wherein
the switching controller controls the radio wave condition monitor not to monitor any of the radio wave conditions of the communication media outside the monitoring area.

2. A mobile communication device to be mounted on a mobile object and perform radio communication with a ground base station, the mobile communication device comprising:
a radio wave condition monitor capable of monitoring radio wave conditions of a plurality of communication media that use different respective communication schemes for communication with the ground base station;
a storage to store communication medium information, the communication medium information indicating a communication medium having a good radio wave condition in each of a plurality of travel sections into which a route is divided, the mobile object traveling on the route;
a switching controller to perform control for switching a communication medium to be used, on the basis of the communication medium information and position of the mobile object when the travel section in which the mobile object is traveling is changed; and
a radio communication switch to switch the communication medium to be used, under control of the switching controller, wherein
when the mobile object moves from a first travel section to a second travel section, the switching controller causes the radio wave condition monitor to monitor, in a monitoring area, a radio wave condition of a first communication medium and a radio wave condition of a second communication medium, the first communication medium having a good radio wave condition in the first travel section, the second communication medium having a good radio wave condition in the second travel section, the monitoring area being a preset area including a boundary between the first travel section and the second travel section, the switching controller instructing the radio communication switch to perform switchover from the first communication medium to the second communication medium, on the basis of monitoring results provided by the radio wave condition monitor, wherein
when an instruction position being a position on the route at which the switching controller has instructed the radio communication switch to perform switchover from the first communication medium to the second communication medium is different from the boundary, the switching controller stores information on a difference between the instruction position on the route and the boundary into the storage.

3. The mobile communication device according to claim 2, wherein
to collect information on the radio wave conditions of the communication media to be used for generation of the communication medium information, the switching controller controls the radio wave condition monitor to monitor the radio wave conditions of the communication media on the route, and stores the information on the radio wave conditions of the communication media into the storage.

4. The mobile communication device according to claim 3, wherein
the switching controller changes a size of the monitoring area on the basis of the information on the difference.

5. The mobile communication device according to claim 2, wherein
the switching controller changes a size of the monitoring area on the basis of the information on the difference.

6. A communication medium information generating device comprising:
an obtainer to acquire the information on the radio wave conditions of the plurality of communication media collected by the mobile communication device according to claim 2; and
a generator to generate communication medium information by using the information on the radio wave conditions of the plurality of communication media acquired by the obtainer.

7. The communication medium information generating device according to claim 6, wherein
the obtainer acquires the information on the difference from the mobile communication device, and
the generator modifies the communication medium information by using the information on the difference.

8. A mobile communication device to be mounted on a mobile object and perform radio communication with a ground base station, the mobile communication device comprising:
a radio wave condition monitor capable of monitoring radio wave conditions of three or more communication media to be used for communication with the ground base station;
a storage to store communication medium information, the communication medium information indicating a communication medium having a good radio wave condition in each of three or more travel sections into which a route is divided, the mobile object traveling on the route;

a switching controller to perform control for switching a communication medium to be used, on the basis of the communication medium information when the travel section in which the mobile object is traveling is changed; and a radio communication switch to switch the communication medium to be used, under control of the switching controller, wherein when the mobile object travels on the route, the switching controller causes the radio wave condition monitor to monitor, in each monitoring area being a preset area including a boundary between the travel sections, a radio wave condition of the communication medium among the communication media that has a good radio wave condition in the travel section located rearward in a traveling direction of the mobile object closest to the boundary and a radio wave condition of the communication medium among the communication media that has a good radio wave condition in the travel section located forward in the traveling direction of the mobile object closest to the boundary, and the switching controller instructs the radio communication switch to perform switchover from the communication medium having the good radio wave condition in the rearward located travel section to the communication medium having the good radio wave condition in the forward located travel section, on the basis of monitoring results provided by the radio wave condition monitor.

* * * * *